US011414055B2

(12) United States Patent
Respass et al.

(10) Patent No.: US 11,414,055 B2
(45) Date of Patent: Aug. 16, 2022

(54) BICYCLE HANDLEBAR TO FORKS ALIGNMENT TOOL

(71) Applicants: Scott Robert Respass, Greenville, SC (US); Robert Charles DeMao, II, Taylors, SC (US)

(72) Inventors: Scott Robert Respass, Greenville, SC (US); Robert Charles DeMao, II, Taylors, SC (US)

(*) Notice: Subject to any disclaimer, the term of this patent is extended or adjusted under 35 U.S.C. 154(b) by 0 days.

(21) Appl. No.: 16/949,925

(22) Filed: Nov. 20, 2020

(65) Prior Publication Data

US 2021/0146890 A1   May 20, 2021

Related U.S. Application Data

(60) Provisional application No. 62/937,896, filed on Nov. 20, 2019.

(51) Int. Cl.
*B60S 5/00* (2006.01)
*B25B 27/00* (2006.01)
*B62K 21/22* (2006.01)
*B62K 21/12* (2006.01)

(52) U.S. Cl.
CPC ............ *B60S 5/00* (2013.01); *B25B 27/0071* (2013.01); *B62K 21/12* (2013.01); *B62K 21/22* (2013.01)

(58) Field of Classification Search
CPC .............................. B25B 27/0071; B62K 21/22
See application file for complete search history.

(56) References Cited

U.S. PATENT DOCUMENTS

| 2,667,798 A | 2/1954 | Beasley |
| 3,925,873 A | 12/1975 | Mecum |
| 4,260,171 A | 4/1981 | Foster |
| 4,390,300 A | 6/1983 | Foster |
| 5,303,439 A | 4/1994 | Seals |
| 5,331,865 A | 7/1994 | Oskam |
| 5,931,049 A | 8/1999 | Tsai |

(Continued)

FOREIGN PATENT DOCUMENTS

GB    2521854 A    7/2015

OTHER PUBLICATIONS

Get your handlebar and front wheel perfectly aligned (n.d.). Retreived Nov. 4, 2020, from https://bikerumor.com/2020/11/04/get-your-handlebar-and-front-wheel-perfectly-aligned-w-dnr-designs-new-tool.

(Continued)

*Primary Examiner* — Vicky A Johnson
(74) *Attorney, Agent, or Firm* — Dunlap Bennett & Ludwig, PLLC

(57) ABSTRACT

An alignment tool for aligning the handlebars relative to the front fork of a bicycle. The alignment tool provides a handlebar connection point and a fork connection point that simultaneously engages the handlebars and the fork assembly, respectively, spaced apart from the fork assembly. In certain embodiment, the handlebar connection point and the fork connection point are movable relative to each other between a plurality of contracted and extended conditions. The method of using the present invention embodies the alignment tool to engage while adjusting the handlebars relative to the fork assembly in such as ways as to gauge the alignment tool's alignment, and thus the handlebar's assembly, relative to the fork assembly.

8 Claims, 3 Drawing Sheets

(56) References Cited

U.S. PATENT DOCUMENTS

| | | |
|---|---|---|
| 7,296,813 B2 | 11/2007 | Montague et al. |
| 7,690,128 B1 | 4/2010 | Thompson |
| 7,976,045 B2 | 7/2011 | Lane |
| 8,661,935 B2 | 3/2014 | Cote et al. |
| 9,630,303 B2 * | 4/2017 | Hamilton ............ B25B 27/0071 |
| 2004/0088845 A1 | 5/2004 | Winkenbach et al. |
| 2005/0109152 A1 | 5/2005 | Hsu |
| 2005/0206120 A1 * | 9/2005 | Liao ....................... B62K 21/16 |
| | | 280/281.1 |
| 2012/0233833 A1 | 9/2012 | Balser |
| 2014/0375993 A1 | 12/2014 | Kettle |
| 2015/0050073 A1 | 2/2015 | Forgrave |
| 2016/0031519 A1 | 2/2016 | Marui |
| 2018/0057093 A1 | 3/2018 | Lenig |
| 2018/0354578 A1 | 12/2018 | Gu |

OTHER PUBLICATIONS

International Search Report and Written Opinion; PCT/US20/61490; dated Mar. 12, 2021.

* cited by examiner

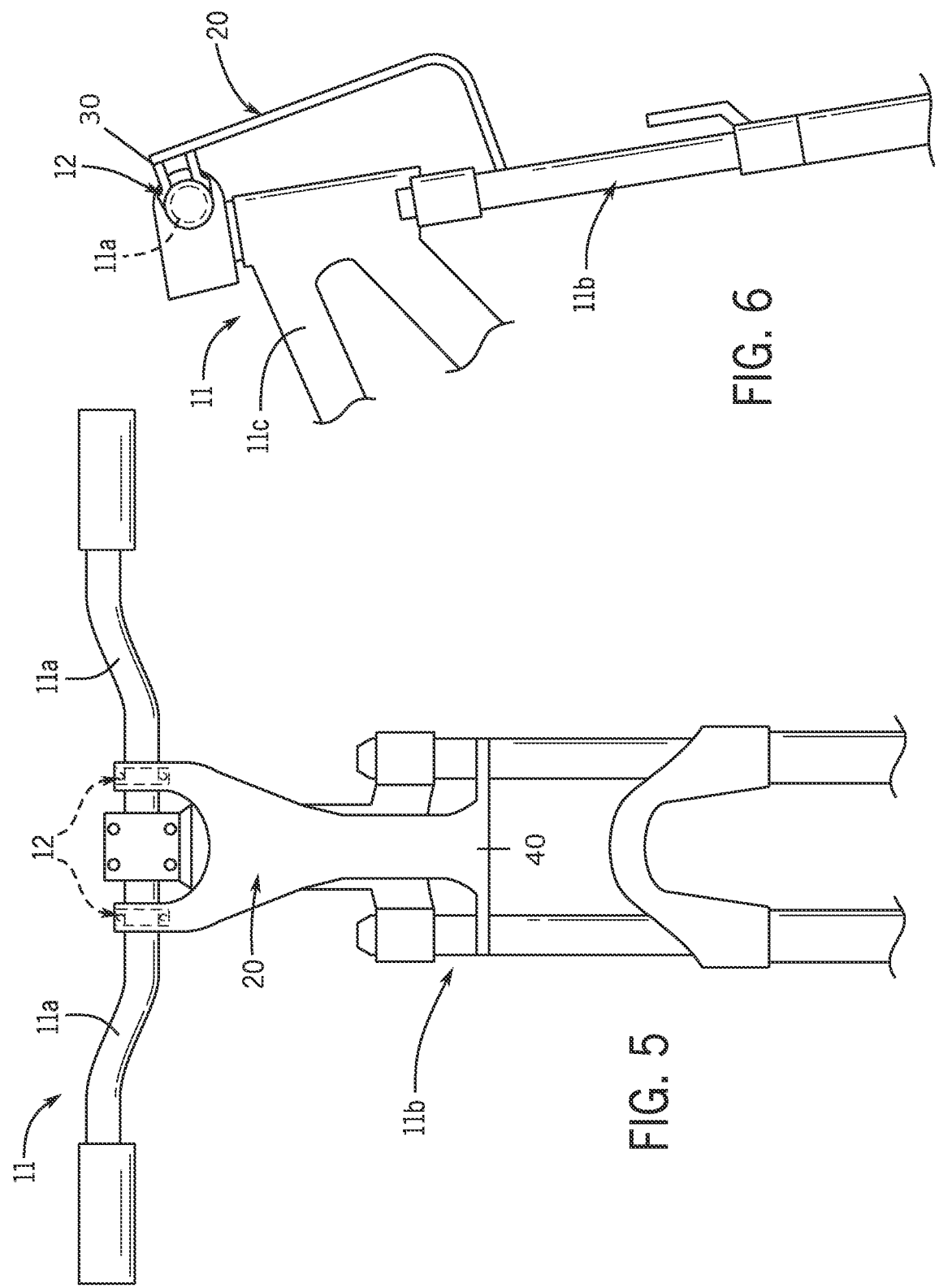

BICYCLE HANDLEBAR TO FORKS ALIGNMENT TOOL

CROSS-REFERENCE TO RELATED APPLICATION

This application claims the benefit of priority of U.S. provisional application No. 62/937,896 filed 20 Nov. 2019, the contents of which are herein incorporated by reference.

BACKGROUND OF THE INVENTION

The present invention relates to bicycle tools and, more particularly, an alignment tool to align handlebars to forks of any type of bicycle.

During the set-up of a bicycle there are no true or accurate methods of aligning the handlebars to the fork of the bike, nor dedicated handlebar alignment tool. This leads to time consuming set-ups and which allows for inaccurate alignments of the handlebars to the fork. In short, there are no front-end alignment aids available for bicycles, and as a result bicycle riders and bicycle repair shops must employ makeshift solutions. One makeshift approach is using a tape measure to measure the distance of the handlebar, end to end, and dividing by two, for defining the midpoint on bicycle frame, and thus proper alignment. Another example is visually aligning handlebars to the tire and/or the fork.

As can be seen, there is a need for a tool to align handlebars to the front fork of any type of bicycle, and a method of using the same. The alignment tool embodied in the present invention will allow the user to provide an accurate alignment between the handlebars relative to the front fork on a bicycle, quickly solving mis-alignment problems, thereby shortening bicycle set-up times and providing a safe, true bicycle alignment for the rider.

SUMMARY OF THE INVENTION

In one aspect of the present invention, an alignment tool for a handlebar assembly of a bicycle, the alignment tool includes a body extending between a handlebar connection and a fork connection, wherein a lower portion of the fork connection has a transverse orientation relative to an upper portion of the fork connection.

In another aspect of the present invention, the alignment tool includes a pair of handlebar clamp assemblies, each handlebar clamp assembly spaced apart from the other along the handlebar connection, wherein each handlebar clamp assembly includes two spaced apart clamp arms, wherein the handlebar connection includes a symmetrical U-shape spacing apart the pair of handlebar clamp assemblies; and further including an adjustment mechanism securing the fork connection relative to the handlebar connection between a plurality of contracted and extended conditions, wherein the adjustment mechanism includes a slot in said lower portion, wherein said lower portion is movable relative to said upper portion; and one or more fasteners securing a plurality of portions of the slot to said upper portion.

In another aspect of the present invention, a method of aligning a handlebar to a front fork assembly of a bicycle, the method includes interconnecting the handlebar to the front fork assembly by way of a body, wherein an upper portion of the body removably attaches to the handlebars, wherein a lower portion of the body removably attaches to the front fork assembly in such a way that the upper portion is spaced apart from the front fork assembly by between three-quarters of an inch to two inches.

These and other features, aspects and advantages of the present invention will become better understood with reference to the following drawings, description and claims.

BRIEF DESCRIPTION OF THE DRAWINGS

FIG. 5 is a front elevation view of an exemplary embodiment of a nonadjustable the present invention shown in use; and FIG. 6 is a side elevation view of an exemplary embodiment of the present invention shown in use.

DETAILED DESCRIPTION OF THE INVENTION

Figure 2:
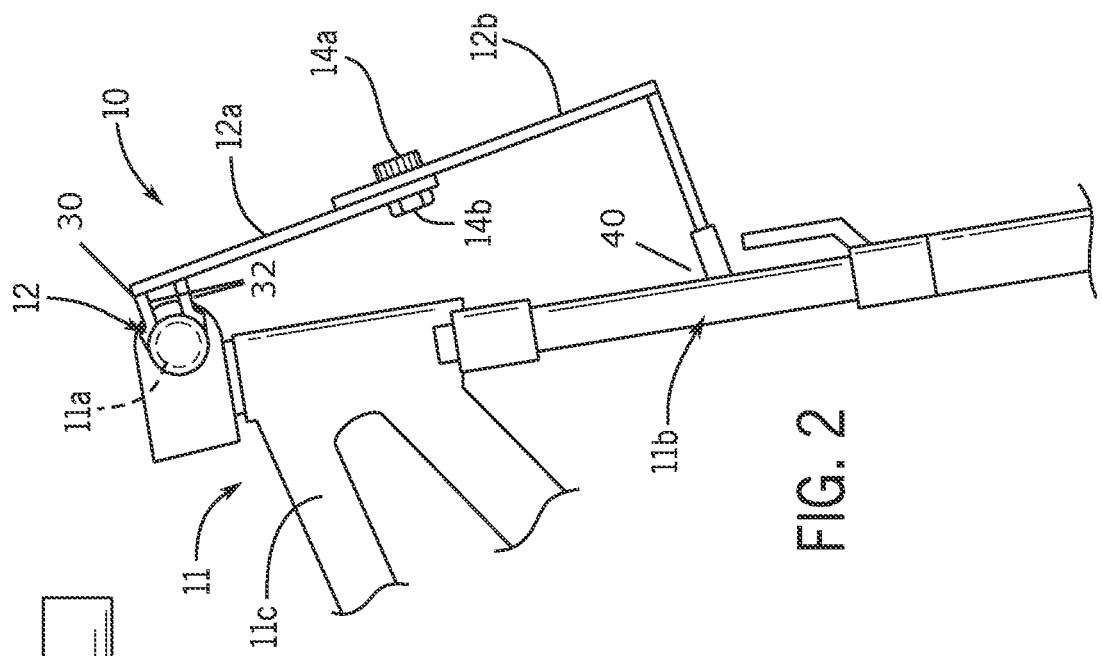
FIG. 2 is a side elevation view of an exemplary embodiment of the adjustable alignment tool 10 of the present invention shown in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an alignment tool for aligning the handlebars relative to the front fork of a bicycle. The alignment tool provides a handlebar connection point and a fork connection point that simultaneously engages the handlebars and the fork assembly, respectively, in a spaced apart manner. In certain embodiment, the handlebar connection point and the fork connection point are movable relative to each other between a plurality of contracted and extended conditions. The method of using the present invention embodies the alignment tool to adjust the handlebars relative to the fork assembly and to gauge the alignment tool's alignment relative to the fork assembly.

It should be understood by those skilled in the art that the use of directional terms such as upper, lower, upward, downwardly, top, left, right and the like are used in relation to the illustrative embodiments as they are depicted in the figures, the upward direction (or upper) being toward the top of the corresponding figures, downward direction being toward the bottom of the corresponding figures, and so on regarding left and right.

Referring now to FIGS. 1 through 6, the present invention may include an adjustable alignment tool 10 or nonadjustable alignment tool 20 to align the handlebars 11a to the fork assembly 11b of any type of bicycle 11.

The alignment tool 10 or 20 extends between a handlebar connection 30 and a fork connection 40 so that the alignment tool 10 or 20 simultaneously operatively associates with the handlebars 11a and the fork assembly 11b, respectively. The alignment tool 10 or 20 may be made from aluminum or other solid materials that provide sufficient strength for the functionality disclosed herein, including the ability to hold a consistent shape while subject to bending stresses contemplated herein.

The handlebar connection 30 may include two handlebar clamping assemblies 12, each handlebar clamping assembly 12 spaced apart as a result of, in certain embodiments, a spacer member 12a. The spacer member 12a may be a U-shaped or V-shaped plate or other structure having two spaced apart connection points, each connection point supporting the respective handlebar clamping assembly 12. Whereby each bar of the handlebars 11a is engaged by a handlebar clamping assembly 12, as illustrated in FIGS. 1, 2, 5 and 6. Each handlebar clamping assembly 12 may provide a pair of spaced apart arms 32, where each arm 32 engages a respective upper and lower part of each bar.

The fork connection 40 may include a first portion 12a and second portion 12b, wherein the first portion 12a may be generally aligned with, integrated with, or even an extension of the spacer member 12a, and wherein the second portion 12b is oriented transverse relative the first portion 12a. In certain embodiments, the second portion 12b may be perpendicularly oriented in the form of a squared-off or rounded L-shape. This transverse orientation facilitates the simultaneous operative association of the handlebars 11a and the fork assembly 11b, which may not be coplanar.

Figure 1:
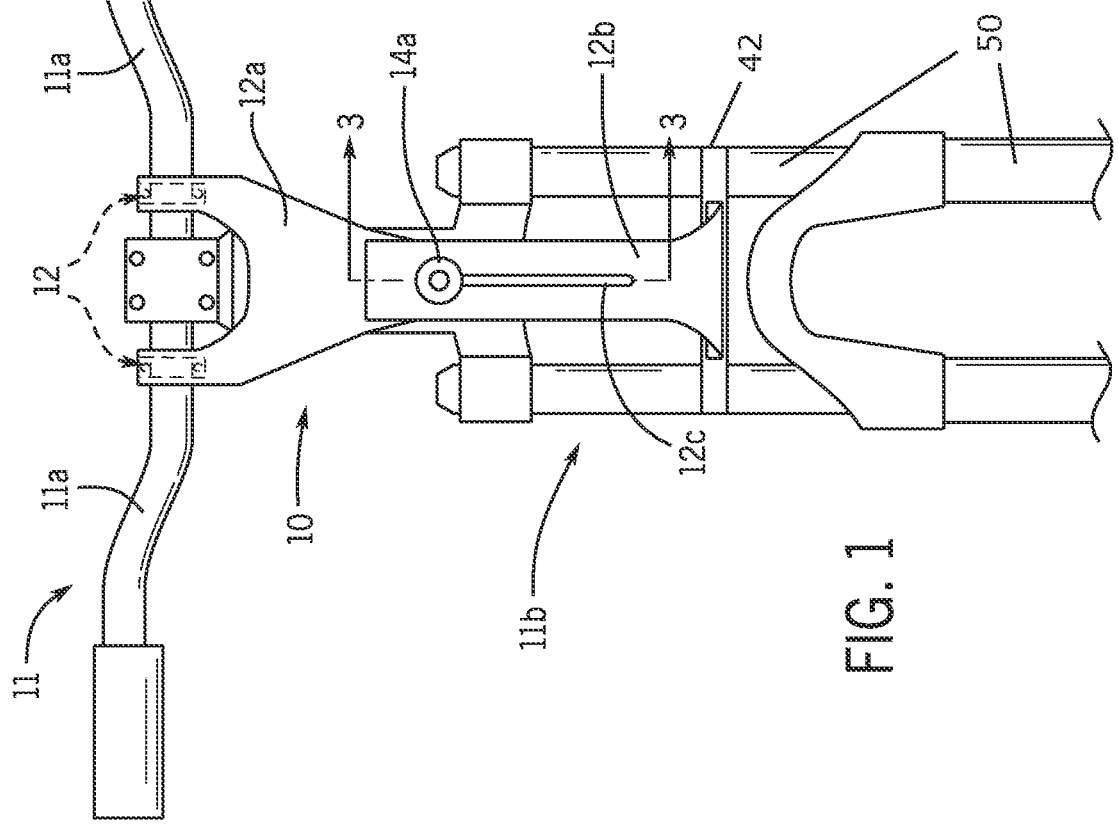
FIG. 1 is a front elevation view of an exemplary embodiment an adjustable alignment tool 10 of the present invention shown in use.
Figure 4:
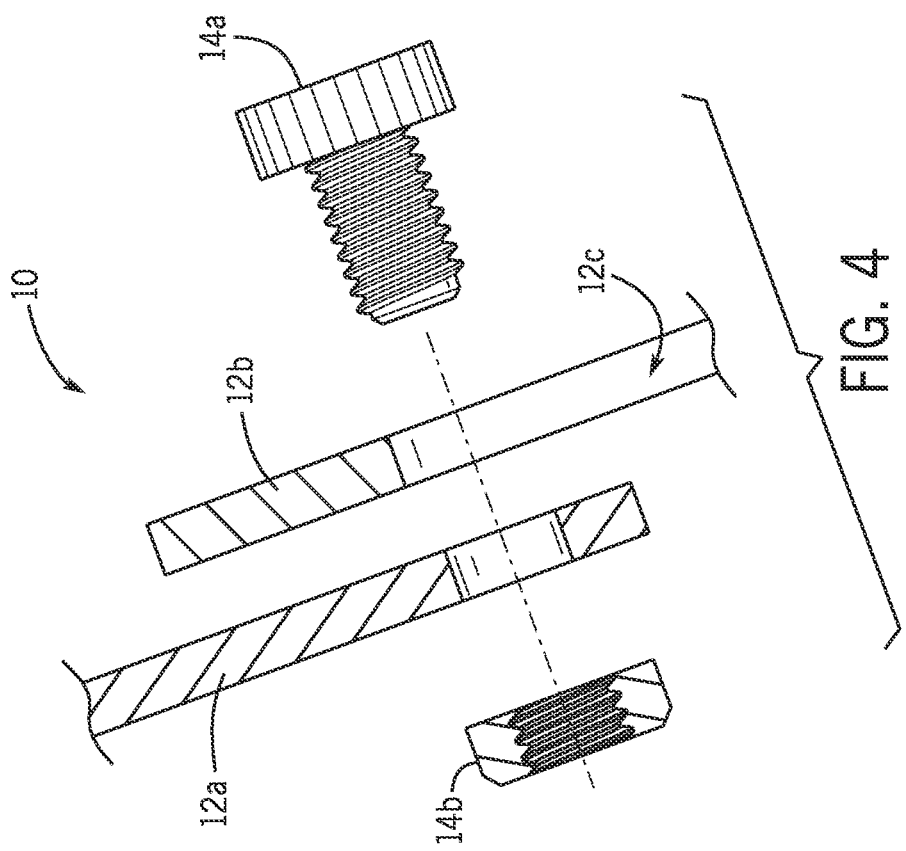
FIG. 4 is an exploded detailed view of FIG. 3.
Figure 3:
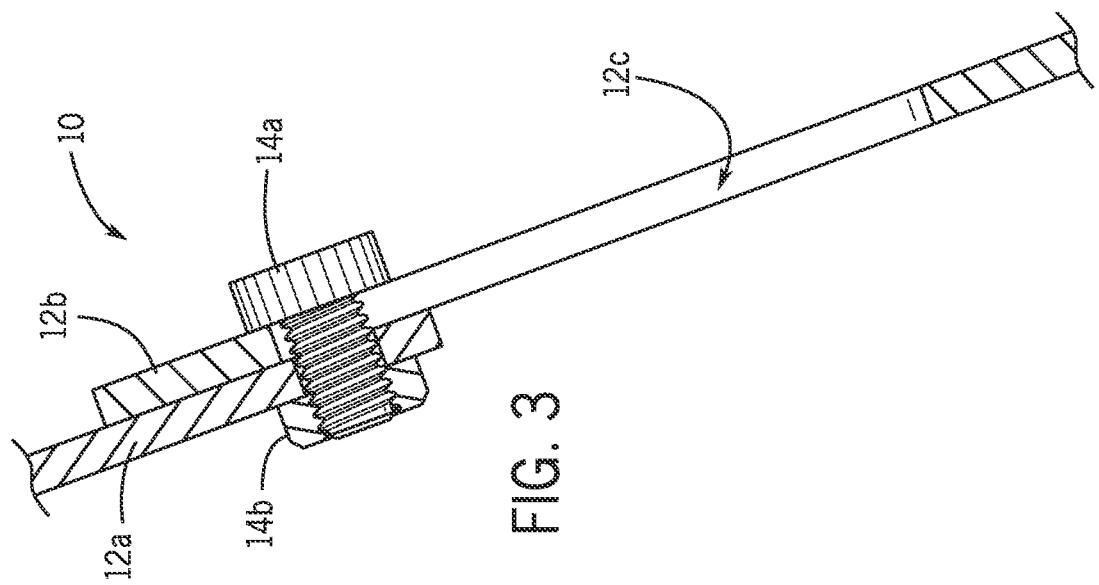
FIG. 3 is a cross sectional view of an exemplary embodiment of an alignment tool 10 that is adjustable, specifically an interface between a handlebar connection 30 and a fork connection 40 of the present invention.

The fork connection 40 may provide two arms 42 to engage the spaced apart left and right stanchion/fork members 50 of the fork assembly 11b, as illustrated in FIGS. 1 and 5. It being understood that the fork connection 40 may be adapted to connect to a portion of the bicycle frame 11c that does not have spaced apart fork members 50; for instance, a single frame member (or 'stem') from which the spaced apart left and right fork members 50 depends.

In certain embodiments, the fork connection 40 is adjustable relative to the handlebar connection 30. In certain embodiments, the second portion 12b is separable from the handlebar connection 30/spacer member 12a in such a way as to be movable relative each other. The second portion 12b may provide a vertical (upward and downward) slot 12c. The present invention may provide one or more adjustable fasteners 14a and 14b (including but not limited to a quick-release adjustable handle, threaded fasteners, and/or the nut shown in the illustrations) that can secure any portion of a periphery of the slot 12c to the first portion 12a. The adjustability enables a user to selectively choose which portion of the spaced apart fork assembly 12b that the fork connection 40 removably secures to, through the alignment tool 10 being extendable between a plurality of contracted conditions and extended conditions.

The alignment tool 10 or 20 (or a portion thereof) may be wrapped in the non-abrasive sheet of material (not shown), such as plastic to prevent scarring of the bicycle 11.

A method of using the present invention may include the following. The alignment tool 10 or 20 disclosed above may be provided. A user may first remove the front tire of the bicycle 11. The user may then position the alignment tool 10 or 20 to mount the handlebar connection 30 to the front-center handlebars 11a, by way of the handlebar clamping assemblies 12, on the left and right side of the stem, as illustrated in FIGS. 1, 2, 5 and 6. Then the user may attach the fork connection 40 to the fork assembly 11b using mechanical fasteners, adhesive strips, glue, or the like in such a way that the second portion 12b of the alignment tool 10 is spaced away from fork assembly 11b approximately one inch while completing the next step. This can be important because this will prevent abrasive marks while adjusting to 11b. Once mounted, for the adjustable alignment tool 10, the user may loosen the adjustable fasteners 14a and 14b to allow movement of the fork connection 40 relative to the handlebar connection 30.

Using the quick release adjustable fasteners 14a and 14b, the user may loosen and selectively pull the second portion 12b between various contracted or extended conditions, based in part of the dimensions of the bicycle frame 11c. Then the user may tighten the quick release fasteners 14a and 14b. Then the user may lightly adjust the handlebars 11a and fork assembly 11b until the alignment tool 10 is even on both sides of or relative to the fork assembly 11b stanchions must have even contact one each side of the fork assembly. Once aligned, the user may tighten the handlebar 11a stem hardware and ensure the alignment tool 10 is still touching both stanchions/form members 50. If the alignment tool 10 is not touching both sanctions/fork members 50, the user may loosen the fasteners 14a and 14b and repeat the previous steps. Once evenly touching the fork sanctions, the user may remove the alignment tool 10 or 20, as the handlebars 11a and fork assembly 11b are now aligned precisely for safe riding.

It should be understood, of course, that the foregoing relates to exemplary embodiments of the invention and that modifications may be made without departing from the spirit and scope of the invention as set forth in the following claims.

What is claimed is:

1. An alignment tool for a handlebar/fork assembly of a bicycle, the alignment tool comprising:
    a body extending between a handlebar connection and a fork connection, wherein a lower portion of the fork connection has a transverse orientation relative to an upper portion of the fork connection, wherein the handlebar connection provides two bar connection points spaced apart in a first direction, and wherein the fork connection provides two stanchion connection points spaced apart in the first direction.

2. The alignment tool of claim 1, wherein the two bar connection points comprise a pair of handlebar clamp assemblies.

3. The alignment tool of claim 2, wherein each handlebar clamp assembly includes two spaced apart clamp arms.

4. The alignment tool of claim 2, wherein the handlebar connection includes a symmetrical U-shape spacing apart the pair of handlebar clamp assemblies.

5. The alignment tool of claim 2, further comprising an adjustment mechanism operatively associated with the fork and handlebar connections in such a way that the fork connection is moveable relative to the handlebar connection in a second direction between a plurality of contracted and extended conditions, wherein the second direction is orthogonal relative to the first direction.

6. The alignment tool of claim 5, wherein the adjustment mechanism comprises:
    a slot in said upper portion; and
    one or more fasteners removably securing a plurality of portions of the slot to a handlebar portion of the body.

7. A method of aligning a handlebar to a front fork assembly of a bicycle, the method comprising:
    interconnecting the handlebar to the front fork assembly by way of an alignment tool of claim 1, wherein the two bar connection points removably attach to the handlebars, wherein the two stanchion connection points removably attach to the front fork assembly in such a way that the upper portion is spaced apart from the front fork assembly by between three-quarters of an inch to two inches.

8. An alignment tool for a handlebar/fork assembly of a bicycle, the alignment tool comprising:

a body extending between a handlebar connection and a fork connection, wherein the body comprises:
   a handlebar portion; and
   a fork portion, wherein the fork portion comprises a lower portion and an upper portion, wherein the lower portion is orthogonal relative to the upper portion, and wherein the lower portion extends between three-quarters of an inch and two inches between the upper portion and the fork connection;
the handlebar connection provides two handlebar clamp assemblies spaced apart in a first direction, wherein each handlebar clamp assembly includes two spaced apart clamp arms, and wherein the handlebar portion includes a symmetrical U-shape spacing apart the pair of handlebar clamp assemblies;
the fork connection provides two stanchion connection points spaced apart in the first direction;
an adjustment mechanism operatively associated with the fork and handlebar portions in such a way that the fork connection is moveable relative to the handlebar connection in a second direction between a plurality of contracted and extended conditions, wherein the second direction is orthogonal relative to the first direction; and
the adjustment mechanism comprises:
   a slot in said upper portion; and
   one or more fasteners removably securing one of a plurality of portions of the slot to said handlebar portion.

\* \* \* \* \*